Sept. 2, 1952          G. E. HALL          2,608,767
GAUGE FOR CONE TIPPED TOOLS
Filed March 6, 1946          2 SHEETS—SHEET 1
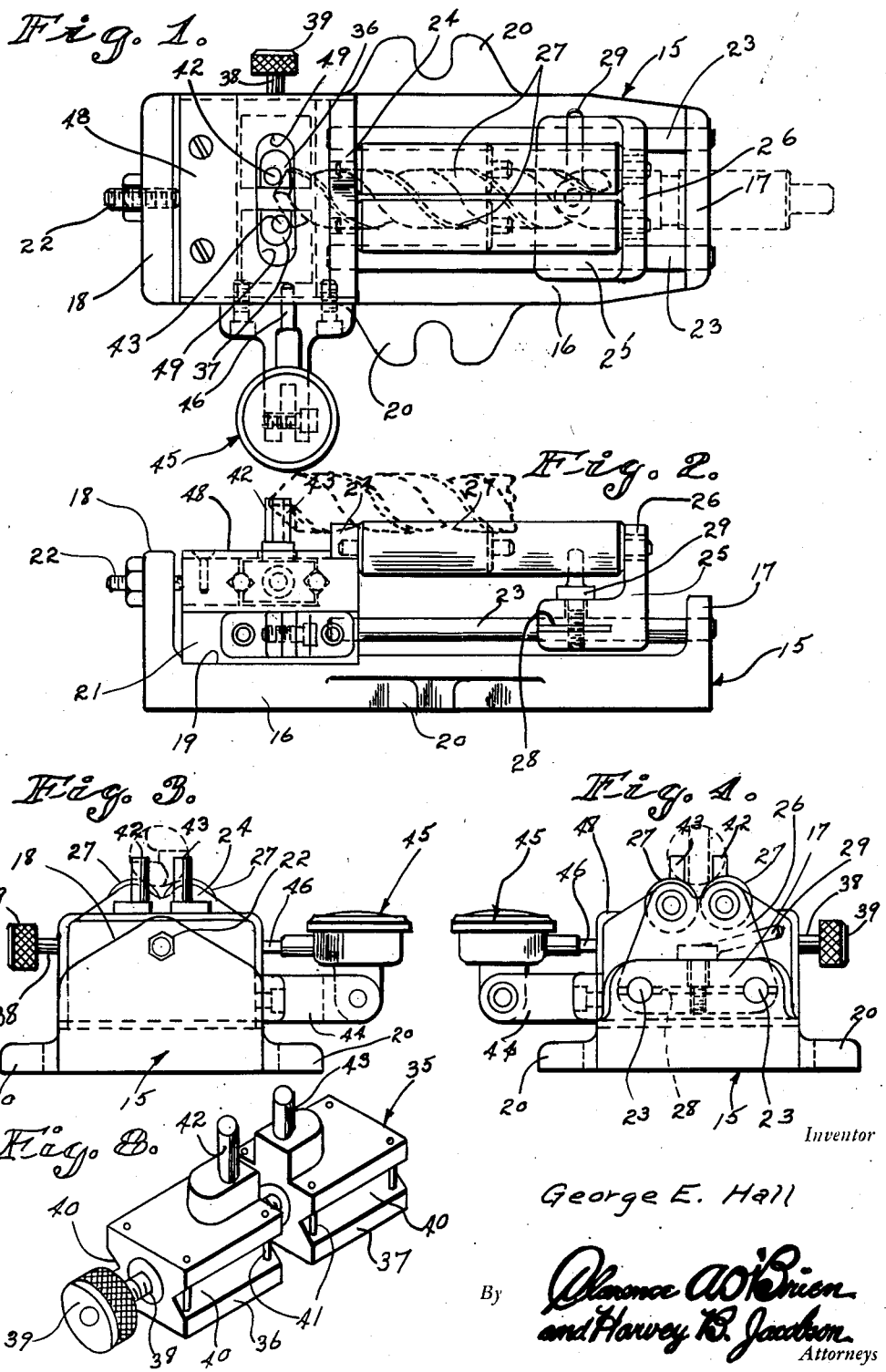
Inventor
George E. Hall
By Clarence A. O'Brien
and Harvey B. Jackson
Attorneys

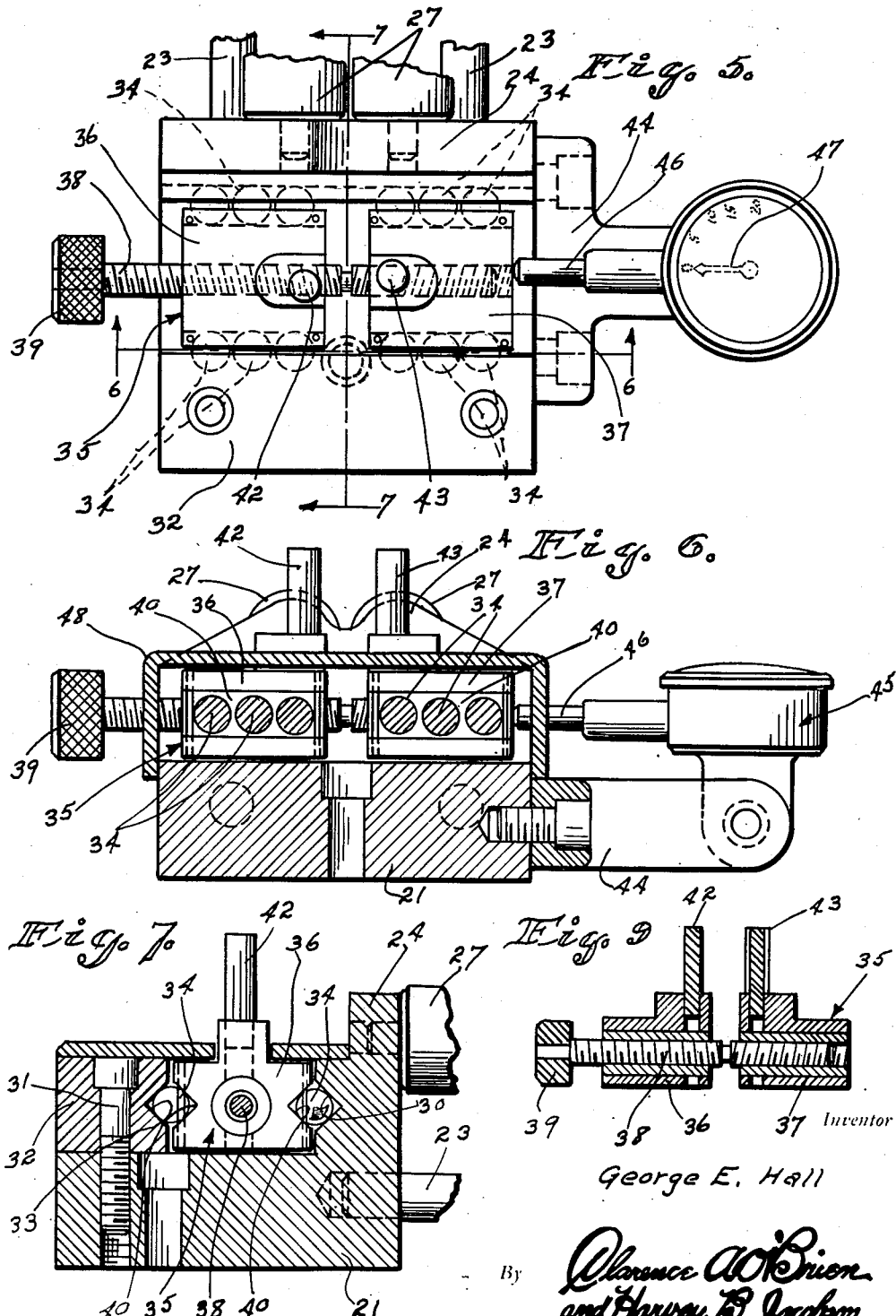

Patented Sept. 2, 1952

2,608,767

UNITED STATES PATENT OFFICE 2,608,767

GAUGE FOR CONE TIPPED TOOLS

George E. Hall, Flint, Mich.

Application March 6, 1946, Serial No. 652,282

6 Claims. (Cl. 33—201)

This invention relates to a gage and more particularly to a device for gaging the accuracy of work such as machine tools, drills and the like.

The primary object of the invention is to determine imperfect conicity of the machined or ground conical tip on a piece of work.

Another object is to determine the angle of the conical end of a drill bit with accuracy.

The above and other objects may be attained by employing this invention which embodies among its features a gage unit adapted to move transversely of a work piece, means for orienting the work piece with relation to the gage unit, gage pins carried by the gage unit and adapted to engage the work and means actuated by the transverse movement of the gage unit to detect imperfect conicity in the conical tip of the work piece.

Other features include longitudinally offsetting the gage pins with relation to the work piece, so that an imperfect conicity of the conical angle on the tip of a drill bit may readily be detected.

A further feature includes the adjustment of the distance between the gage pins to accommodate work pieces of different sizes.

In the drawings:

Figure 1 is a plan view of a gage embodying the features of this invention,

Figure 2 is a side view thereof,

Figure 3 is an end view taken from the left-hand end of Figure 1,

Figure 4 is an end view taken at the opposite end of Figure 1,

Figure 5 is a fragmentary plan view of the gaging end of the device, showing the cover omitted, Figure 6 is a longitudinal transverse sectional view taken substantially along the line 6—6 of Figure 5, Figure 7 is a longitudinal sectional view taken substantially along the line 7—7 of Figure 5, Figure 8 is a perspective view of the gage unit, and Figure 9 is a longitudinal sectional view through Figure 8.

Referring to the drawings in detail, a base designated generally 15 comprises a bottom 16 provided at one end with an upstanding flange 17 and at its opposite end with an upstanding flange 18 which is of greater height than the flange 17. Formed in the upper face of the base plate 16 adjacent the flange 18 is a transversely extending groove 19, the purpose of which will more fully hereinafter appear, and formed intermediate the ends of the base plate 16 are outwardly extending slotted attaching lugs 20 by means of which the device may be attached to a work bench or the like.

Seated in the groove 19 is a base block 21 in which the gage unit to be more fully hereinafter described is seated. This block is held in proper position in the base plate 16 by means of a suitable set-screw 22 and is formed in the face opposite the flange 17 with spaced sockets for the reception of the ends of a pair of spaced parallel guide rails 23 which extend through openings formed in the flange 17 to serve as guides as will be more fully hereinafter explained. Extending upwardly from the block 21 adjacent the face carrying the sockets in which the guide rails 23 are situated is a flange 24 which is provided with spaced sockets for the reception of the trunnioned ends of the work supporting rollers to be more fully hereinafter explained.

Mounted for sliding movement on the guide rails 23 longitudinally of the base 15 is a carriage 25 carrying an upstanding flange 26 formed with spaced parallel openings forming bearings for the reception of trunnions carried at the ends of work supporting rollers 27 upon which the work piece to be gaged is supported. As illustrated in Figure 2, the bottom of the carriage 25 is provided with a horizontal slot 28 to form a pair of spaced jaws which are adapted to be drawn together in clamping engagement about the guide bars 23 by means of a hand screw 29 in a conventional manner. It will thus be understood that the carriage 25 may be moved longitudinally of the base 15 and tightly clamped at the desired place to hold the rollers 27 in proper position for operation.

It is desirable to have the carriage 25 move longitudinally of the base 15 so that rollers of greater or lesser length as suggested by the dotted lines in Figure 2 may be interchangeably employed to accommodate work pieces of greater or lesser length.

Formed in the face of the flange 24 opposite that carrying the sockets in which the ends of the guide rods 23 are seated is a V-shaped transversely extending groove 30, and attached as by attaching screws 31 to the upper face of the block 21 in spaced relation to the flange 24 is a guide block 32 having a V-shaped groove 33 in the face opposite the face of the flange 24 carrying the groove 30. These grooves cooperate in forming bearing surfaces along which anti-friction ball bearings 34 run as will be understood upon reference to the drawing.

Mounted on the anti-friction ball bearings 34 for transverse movement with relation to the base 15 is a gage unit designated generally 35 which comprises a pair of spaced blocks 36 and 37 provided with longitudinally extending internally threaded apertures for the reception of an adjusting screw 38 provided at one end with a knurled head 39. The threads of the screw 38 at one end are right-hand threads as suggested in Figure 9 and at the opposite end are left-hand threads with the threads in the blocks 36 and 37 corresponding respectively, so that as the screw 38 is turned the blocks will move in unison toward or away from one another. Formed in the side walls of the blocks 36 and 37 are V-shaped grooves 40 for the accommodation of the bearing balls 34 previously referred to and carried adjacent opposite ends of the grooves are retaining pins 41 to limit endwise movement of the balls in the grooves. Projecting upwardly from the block 36 is a gage pin 42 and a similar gage pin 43 extends upwardly from the block 37. It is to be noted that the pins 42 and 43 lie along spaced parallel axes which lie in a plane which is slightly inclined to the axis along which moves the gage unit 35 so that when the conical point of a tool such as a drill bit is to be gaged the accuracy of the angle throughout the entire end area of the tool may be determined at the points of contact between the pins 42 and 43 and the end of the tool.

Mounted on the base block 21 of the gage portion of the device is a bracket 44 which projects laterally with relation to the base 15 and supports adjacent its outer end a conventional gage designated generally 45 provided with a conventional feeler finger 46, the end of which bears against the end of the gage unit 35 previously referred to. The gage unit 45 is equipped with the conventional hand 47 which moves over the face of a dial commonly employed on gages of this type so as to indicate various degrees of movement of the finger 46. A cover 48 having a longitudinal slot 49 may enclose the gage unit 35 in order to protect the mechanism thereof, it being understood that the slot 49 accommodates the pins 42 and 43 and allows for their adjustment toward or away from one another.

In operation it will be understood that a tool is placed on the rollers 27, and assuming that the tool is a drill bit upon which the angle of its cutting end is to be measured, it will be understood that the conical end of the bit is advanced into contact with the pins 42 and 43.

Upon rotating the bit with the conical ends thereof engaging the pins 42 and 43 it will be obvious that an inaccuracy in the shape of the cone will cause the gage unit 35 to move transversely of the base 15 so as to cause the feeler finger 46 of the gage 45 to move and register on the dial of the gage 45 the imperfect conicity of the cone. By reason of the fact that the pins 42 and 43 are longitudinally offset with relation to the work being checked, it will be obvious that the pins 42 and 43 will contact longitudinally spaced surfaces of the conical end of the tool and if too great an error in the conicity of the cone is registered on the gage 45, the tool may be returned for regrinding. Obviously, the device may be used for gaging tools other than bits, and in fact any type of work piece on which the angular face on an end thereof is of importance.

While in the foregoing there has been shown and described the preferred embodiment of this invention it is to be understood that minor changes in the details of construction, combination, and arrangement of parts may be resorted to without departing from the spirit and scope of the invention as claimed.

I claim:

1. In a gage for cone tipped work pieces, an elongated support including a work piece holding means, a pair of spaced parallel identical cylindrical abutments slidingly carried by said support and movable transversely of the support for receiving one end of a work piece, said abutments being longitudinally offset with respect to the longitudinal axis of a work piece on said means whereby the abutments will contact spaced points on the conical end of a work piece, and means on said support and responsive to a transverse movement of said pins relative to a work piece contacting the same for indicating imperfect conicity in the conical end of a work piece.

2. In a gage for cone tipped work pieces, a support, elongated members mounted on said support for holding an elongated work piece, a gage unit disposed on said support and movable transversely of a work piece on said members and also transversely of said elongated members, said gage unit comprising a pair of blocks movable transversely of a work piece on said holding means, a work piece engaging pin carried by each of said blocks and spaced parallel to each other to receive one end of a work piece, one of said pins being disposed relatively closer to the axis of a work piece on said holding means than the other of said pins, whereby the pins will contact longitudinally spaced points on the conical tip of a work piece, means actuated in response to a movement of the gage unit transverse of a work piece on said members for detecting imperfect conicity in the conical tip of a work piece, means for adjusting said blocks relative to each other to space the pins at a predetermined distance, and anti-friction means between said blocks and said supports, said anti-friction means including a plurality of balls, said blocks having recesses therein receiving said balls, said balls contacting the walls of said recesses and said support, and stops carried by said blocks for limiting endwise movement of the balls in the recesses.

3. A gage comprising an elongated base including a bottom having an upstanding flange at each end, one of said flanges being higher than the other of said flanges, said base having a transverse groove in its upper face adjacent the higher of said flanges, a base block seated in the groove and secured in the groove, said base block having a pair of spaced sockets therein facing the shorter of the flanges, the shorter of said flanges including a pair of openings in registry with the sockets, a pair of spaced parallel guide rails terminally secured in said openings and said sockets, said base block including an upstanding flanged portion having a pair of sockets therein, a carriage slidably mounted on the guide rails and including an upstanding flange having a pair of spaced openings, a pair of spaced parallel rollers having reduced end portions rotatably positioned in the sockets in said first-named flanged portion and the openings in said flanged portion of said carriage, means carried by the carriage and engaging the rails to return the carriage longitudinally adjusted on the rails, means carried by the higher of said flanges engaging the base block to hold the base block in proper position on the bottom, a guide block mounted on said base block and spaced from the higher of the flanges, a cover plate overlying the guide block and engaging the higher flange, a pair of blocks slidably received on said bottom for movement laterally of the base between the higher of said flanges and the guide block, a pin rising from each block, said cover plate having a slot receiving the pins, means threaded through the pair of blocks for selectively moving the blocks toward and away from each other, and means mounted on the base block and actuated by movement of the pair of blocks laterally of the base to detect surface irregularities in a work piece supported on the rollers and extending between the pins.

4. A gage comprising an elongated base having an upstanding flange at each of its ends, a base block secured to said base adjacent one of said flanges, a pair of spaced parallel rails secured to the other of said flanges and said base block, a carriage slidably and adjustably mounted on said guide rails, a pair of rollers paralleling said rails and rotatably supported by said carriage and said base block, and a gage unit mounted on said base block, said gage unit including a pair of blocks slidably supported on said base block, means connected to said pair of blocks for selectively moving the pair of blocks toward and away from each other, a pin rising from each block for engaging the surface of a work piece supported on the rollers and extending between the pins, and means supported on the base block and actuated by the pair of blocks during movement of the latter upon the base block for indicating surface irregularities of a work piece supported on the rollers and extending between the pins.

5. A gage comprising an elongated base having an upstanding flange at each end, said base having a recess in its upper face adjacent one of its flanges, a base block seated in the recess, means carried by the flange adjacent the recess engaging the base block and retaining the base block in the recess, a pair of guide rails terminally secured to the base block and the flange of said base remote from said recess, a carriage slidably and adjustably mounted on the guide rails, a pair of work-holding rollers rotatably supported on the base block and the carriage, a flanged portion on the base block extending transversely of the base, a guide block secured to the base block and paralleling the flanged portion, a pair of blocks slidably mounted on the base block between the flanged portion and the guide block, a pair of spaced parallel guide pins rising from the pair of blocks and spaced apart to receive therebetween a work piece on the rollers, means connected to the pair of blocks for selectively moving the blocks toward and away from each other, and means attached to the base block and actuated by the pair of blocks during sliding of the latter to detect irregularities in the surface of the angular tip of a work piece.

6. The combination of claim 5 wherein said pins are longitudinally offset with respect to the longitudinal axis of a work piece on said rollers.

GEORGE E. HALL.

REFERENCES CITED

The following references are of record in the file of this patent:

UNITED STATES PATENTS

| Number | Name | Date |
|---|---|---|
| 1,380,945 | Brown | June 7, 1921 |
| 1,423,339 | Ledell | July 18, 1922 |
| 1,625,462 | Frauenthal | Apr. 19, 1927 |
| 1,625,766 | Simpson | Apr. 19, 1927 |
| 1,818,968 | Anderson | Aug. 18, 1931 |
| 2,024,020 | Aldeborgh | Dec. 10, 1935 |
| 2,123,355 | Feehrer et al. | July 12, 1938 |
| 2,156,500 | Jeschor | May 2, 1939 |
| 2,353,813 | Deeren | July 18, 1944 |
| 2,497,199 | Aller | Feb. 14, 1950 |

FOREIGN PATENTS

| Number | Country | Date |
|---|---|---|
| 451,607 | Great Britain | Aug. 10, 1936 |
| 467,078 | Germany | Oct. 18, 1928 |
| 518,696 | France | Jan. 8, 1921 |
| 597,283 | Germany | May 23, 1934 |
| 874,781 | France | Aug. 26, 1942 |